(12) United States Patent
Chiba (10) Patent No.: US 7,522,189 B2
(45) Date of Patent: Apr. 21, 2009

(54) AUTOMATIC STABILIZATION CONTROL APPARATUS, AUTOMATIC STABILIZATION CONTROL METHOD, AND COMPUTER READABLE RECORDING MEDIUM HAVING AUTOMATIC STABILIZATION CONTROL PROGRAM RECORDED THEREON

(75) Inventor: Naoki Chiba, Higashi-Osaka (JP)

(73) Assignee: Sanyo Electric Co., Ltd., Osaka (JP)

( * ) Notice: Subject to any disclaimer, the term of this patent is extended or adjusted under 35 U.S.C. 154(b) by 652 days.

(21) Appl. No.: 10/943,230

(22) Filed: Sep. 17, 2004

(65) Prior Publication Data

US 2005/0088531 A1    Apr. 28, 2005

(30) Foreign Application Priority Data

Sep. 19, 2003    (JP) ............................. 2003-328014

(51) Int. Cl.
*H04N 5/228* (2006.01)
*H04N 5/225* (2006.01)
*H04N 9/74* (2006.01)

(52) U.S. Cl. ..................... 348/208.6; 348/169; 348/581
(58) Field of Classification Search ............. 348/208.6, 348/208.14, 169, 170, 171, 581, 582; 382/298
See application file for complete search history.

(56) References Cited

U.S. PATENT DOCUMENTS

| | | | | |
|---|---|---|---|---|
| 6,014,169 A | * | 1/2000 | Azusawa et al. | 348/208.8 |
| 6,078,751 A | * | 6/2000 | Yamazaki et al. | 348/E5.034 |
| 6,172,707 B1 | * | 1/2001 | Ouchi et al. | 348/208.6 |
| 6,396,538 B1 | * | 5/2002 | Kobayashi et al. | 348/240.99 |
| 6,400,852 B1 | * | 6/2002 | Miller et al. | 382/298 |
| 6,934,423 B1 | * | 8/2005 | Clapper | 382/298 |

FOREIGN PATENT DOCUMENTS

| | | |
|---|---|---|
| JP | 63-166370 | 7/1988 |
| JP | 07-203279 | 8/1995 |
| JP | 07203279 A * | 8/1995 |
| JP | 11-187303 | 7/1999 |
| JP | 2001-222707 | 8/2001 |

* cited by examiner

*Primary Examiner*—Lin Ye
*Assistant Examiner*—Jason Whipkey
(74) *Attorney, Agent, or Firm*—McDermott Will & Emery LLP (57) ABSTRACT

In an automatic stabilization control apparatus that subjects a moving image picked up by a camera to automatic stabilization control, the apparatus comprises means for designating a range of frames which are to be subjected to automatic stabilization control (hereinafter referred to as a correction frame range); means for calculating a common area where the image is common among the frames within the correction frame range; automatic stabilization control means for subjecting each of the frames within the correction frame range to automatic stabilization control processing involving enlargement of the common area; and enlargement processing means for subjecting vicinity frames preceding and succeeding the correction frame range to enlargement processing.

6 Claims, 10 Drawing Sheets

FRAME i-1

FRAME i

FRAME i-4

FRAME i-3

FRAME i-2

FRAME i-1

FRAME i
(START FRAME
WITHIN
CORRECTION
FRAME RANGE)

FIG. 10

AUTOMATIC STABILIZATION CONTROL APPARATUS, AUTOMATIC STABILIZATION CONTROL METHOD, AND COMPUTER READABLE RECORDING MEDIUM HAVING AUTOMATIC STABILIZATION CONTROL PROGRAM RECORDED THEREON

BACKGROUND OF THE INVENTION

1. Field of the Invention

The present invention relates to a method of picking up a moving image by a camera and carrying out automatic stabilization control of the image picked up.

2. Description of the Background Art

Apparatuses for picking up moving images by cameras and carrying out automatic stabilization control of the images picked up have been conventionally proposed. For example, an apparatus disclosed in JP-A-63-166370 records pixel data in the preceding frame and calculates a motion vector by correlation with the current frame, to carry out automatic stabilization control.

In such a method, however, the automatic stabilization control may end in failure depending on the image. An example is a case where the image hardly patterned or a passing object which rapidly cuts across in front of the camera.

The applicant of the present invention has developed an automatic stabilization control method so adapted as to cause a user to designate a range of frames which are to be subjected to automatic stabilization control excluding frames whose automatic stabilization control may end in failure and subject only the frames in the designated range to automatic stabilization control.

The automatic stabilization control method developed by the applicant of the present invention will be described. The automatic stabilization control method has not been known yet.

Figure 1:
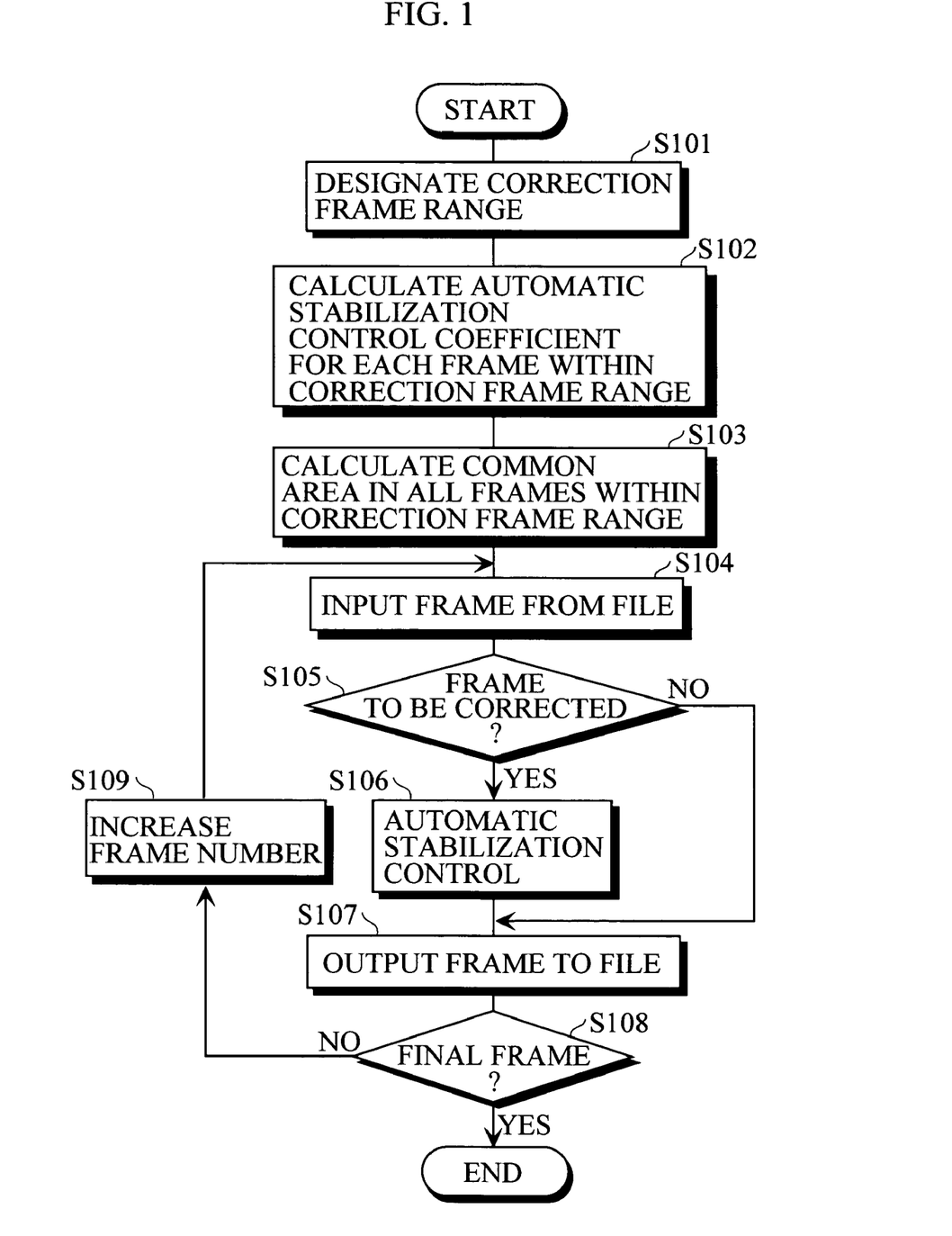
FIG. 1 is a flow chart showing the procedure for automatic stabilization control processing developed by the applicant of the present invention and the procedure for processing for designating a frame which is subjected to automatic stabilization control from image data stored in a file to carry out automatic stabilization control.

FIG. 1 shows the procedure for entire processing of the automatic stabilization control method developed by the applicant of the present invention.

In the step S101, processing for causing a user to designate a range of frames which are to be subjected to automatic stabilization control (a correction frame range) from data representing an image is performed. In the step S102, an automatic stabilization control coefficient for carrying out automatic stabilization control is calculated for each of the frames within the correction frame range. In the step S103, an image area (common area) where the image is common among all the frames within the correction frame range is extracted from the automatic stabilization control coefficient, for each of the frames within the correction frame range, calculated in the step S102.

In the step 104, the frames are read one by one in a memory from a moving image file. In the step S105, it is judged whether or not the frame (target frame) read in the memory is a frame which is to be subjected to automatic stabilization control.

In a case where the target frame read in the memory is a frame which is to be subjected to automatic stabilization control, the frame is subjected to automatic stabilization control processing in the step S106, after which the procedure proceeds to the step S107. In the step S107, the frame after the automatic stabilization control is outputted to an output file.

On the other hand, in a case where the target frame read in the memory is not a frame which is to be subjected to automatic stabilization control, the procedure proceeds to the step S107 without subjecting the frame to automatic stabilization control processing. In the step S107, the frame is outputted as it is to an output file.

In the foregoing step S106, the automatic stabilization control is carried out while enlarging the target frame on the basis of an enlargement ratio calculated from the respective sizes of the common area extracted in the step S103 and the original image and an automatic stabilization control coefficient corresponding to the target frame calculated in the step S102.

In the step 108, it is judged whether or not the target frame is the final frame out of the input frames. The procedure is terminated in a case where the target frame is the final frame, while proceeding to the step S109 in the other case. In the step 109, the frame number of the target frame is updated by one. Thereafter, the procedure is returned to the step 104. In the step S104, the succeeding frame is read, to perform the processing in the step S105 and the subsequent steps again.

Figure 2:
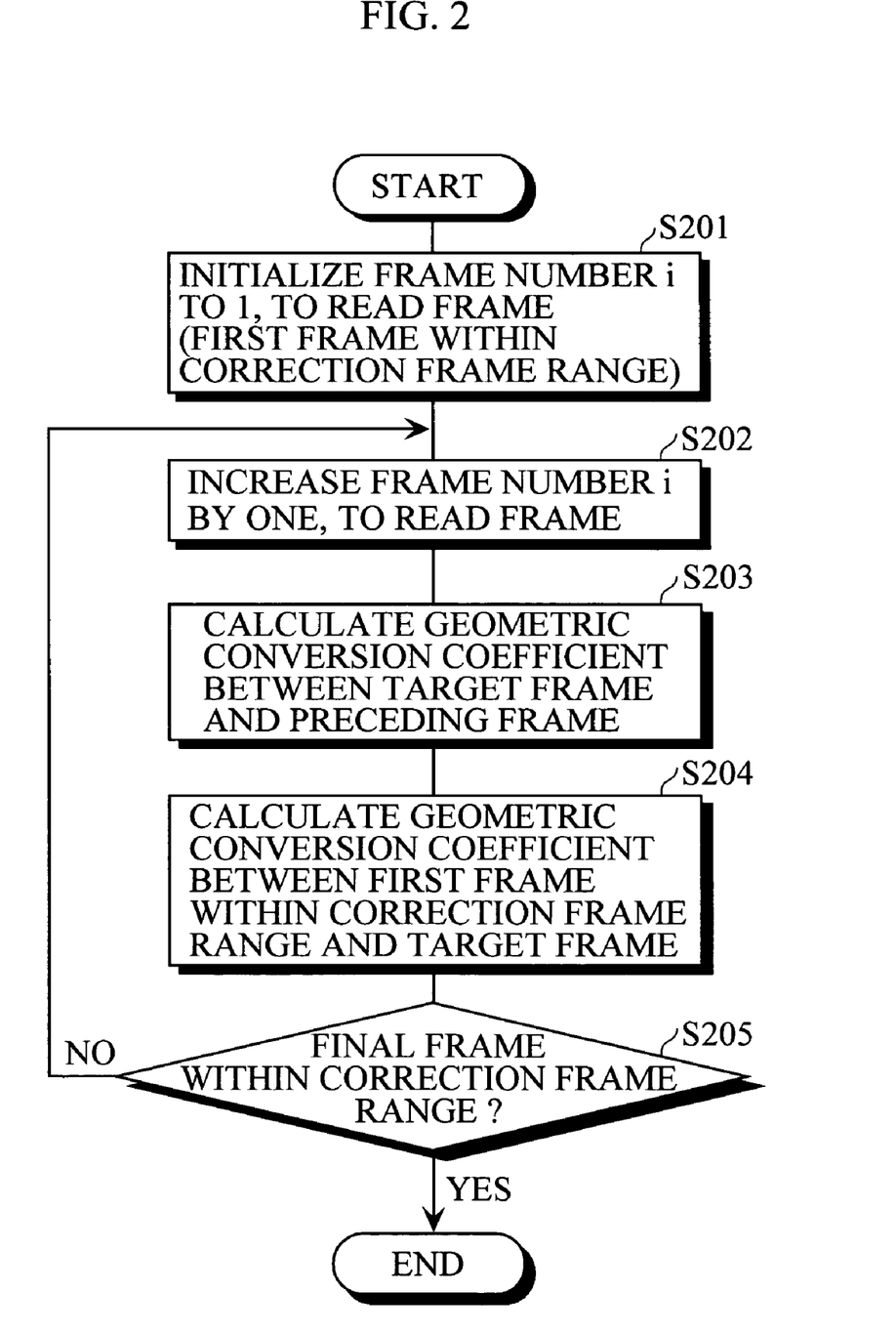
FIG. 2 is a flow chart showing the procedure for processing in the step S102 shown in FIG. 1, that is, processing for calculating an automatic stabilization control coefficient.

FIG. 2 shows the detailed procedure for the processing in the step 102 shown in FIG. 1 (processing for calculating an automatic stabilization control coefficient).

In the step S201, a frame number i is initialized to one in order to process the first frame within the correction frame range, to read in the memory the first frame within the correction frame range. In the step 202, the frame number i is increased by one, to read in the memory the succeeding frame.

In the step S203, a geometric conversion coefficient is calculated between the frame (target frame) read in the step S202 and the preceding frame. The geometric conversion coefficient will be described later. In the step S204, geometric conversion coefficients between the adjacent frames from the first frame within the correction frame range to the target frame are accumulated, to calculate the geometric conversion coefficient between the first frame within the correction frame range and the target frame. The geometric conversion coefficient obtained in the step S204 is an automatic stabilization control coefficient for subjecting the target frame to automatic stabilization control.

In the step 205, it is judged whether or not the target frame is the final frame within the correction frame range. When the target frame is the final frame within the correction frame range, the processing is terminated. In the other case, the procedure is returned to the step S202.

Figure 3A:
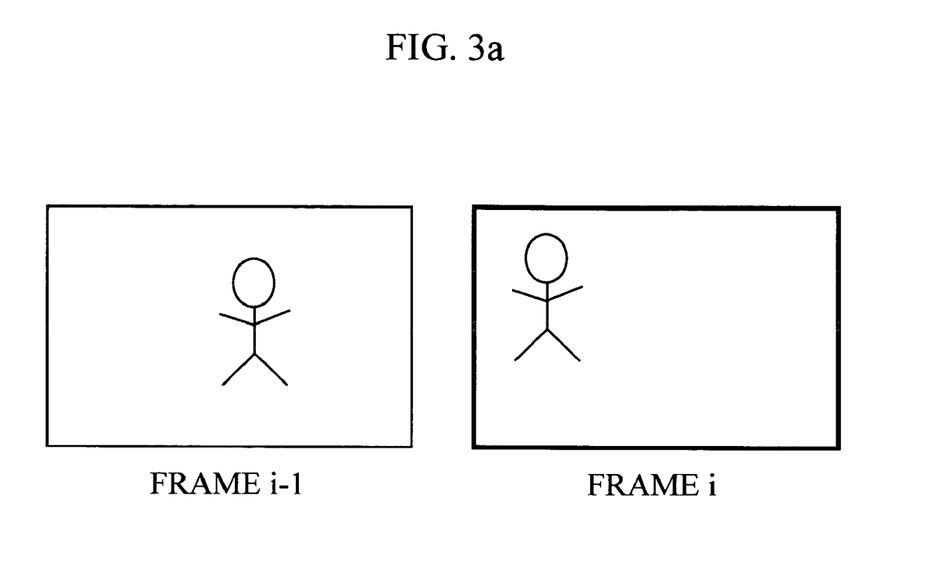
FIGS. 3a and 3b are diagrams for explaining processing for carrying out automatic stabilization control on the basis of geometric conversion.
Figure 3B:
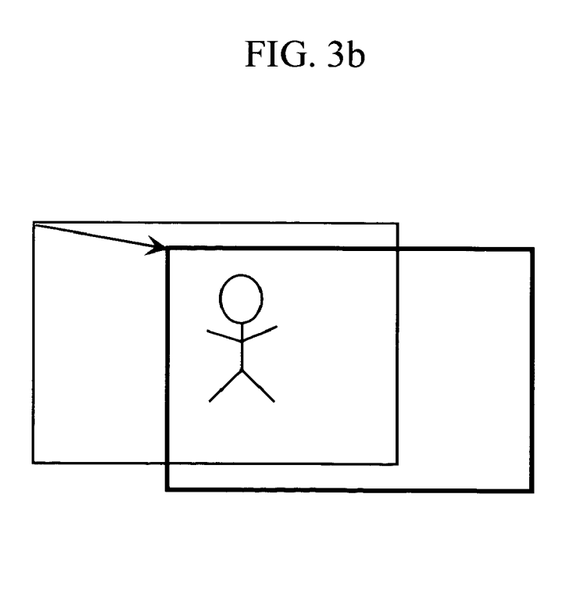

FIGS. 3a and 3b are diagrams for explaining the principle upon which automatic stabilization control is carried out by geometric conversion.

Two frames which are continuous in time shown in FIG. 3a indicate that although the same scene is picked up, the position thereof is shifted by automatic stabilization control. In order to carry out automatic stabilization control so that a subject is not moved, this is feasible by making geometric conversion between the frame number i-1 and the frame number i. The geometric conversion in the simplest case is a two-dimensional parallel movement, which is represented by a two-dimensional parallel movement as indicated by an arrow in FIG. 3b. In the more complicated geometric conversion, affine transformation, projective plane transformation, and so on are used.

The geometric conversion can be calculated by extracting a motion vector between the images. As to the geometric conversion coefficients calculated between the adjacent frames, when a coordinate axis is selected such that the first frame within the correction frame range is used as the basis, the geometric conversion coefficient between each of the frames within the correction frame range and the first frame within the correction frame range can be calculated by successively multiplying the geometric conversion coefficients, starting with the first frame within the correction frame range.

Figure 4:
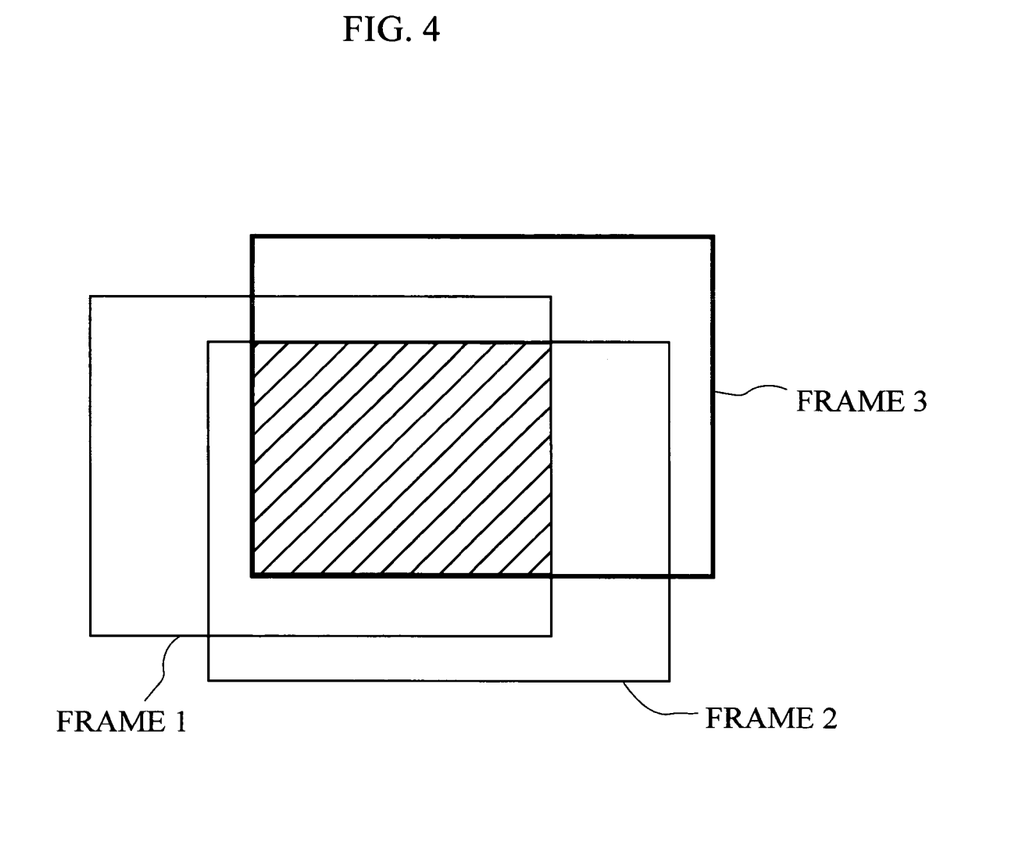
FIG. 4 is a diagram for explaining a common area requiring extraction in carrying out automatic stabilization control on the basis of geometric conversion.

FIG. 4 is a diagram for explaining the processing in the step S103 shown in FIG. 1, that is, the processing for extracting the image area (common area) where the image is common among all the frames within the correction frame range from the automatic stabilization control coefficient for each of the frames within the correction frame range.

FIG. 4 illustrates a case of three frames. In order to carry out automatic stabilization control by geometric conversion to indicate that there is no invalid area in a peripheral part of an image, an image area where the image is common among all the frames within the correction frame range, indicated by hatching in FIG. 4, must be extracted. Further, the area is smaller in size than the input frame. Therefore, the area is made equal in size to the input frame by subjecting the image to enlargement processing.

However, the common area is subjected to enlargement processing for the frame which is to be subjected to automatic stabilization control, while not being subjected to enlargement processing in the frame which is not to be subjected to automatic stabilization control. Therefore, an enlargement ratio differs between the frame which is designated as one in the correction frame range and the frame which is not designated as one in the correction frame range. When viewed as the entire series of images, an unnatural joint occurs between the frame which has been subjected to automatic stabilization control and the other frame.

SUMMARY OF THE INVENTION

An object of the present invention is to provide an automatic stabilization control apparatus capable of a user designating frames to be corrected excluding frames whose automatic stabilization control ends in failure and eliminating unnaturalness between the frame which has been subjected to automatic stabilization control involving enlargement and the other frame, an automatic stabilization control method, and a computer readable recording medium having an automatic stabilization control program recorded thereon.

In an automatic stabilization control apparatus that subjects a moving image picked up by a camera to automatic stabilization control, an automatic stabilization control apparatus according to the present invention is characterized by comprising means for designating a range of frames which are to be subjected to automatic stabilization control (hereinafter referred to as a correction frame range); means for calculating a common area where the image is common among the frames within the correction frame range; automatic stabilization control means for subjecting each of the frames within the correction frame range to automatic stabilization control processing involving enlargement of the common area; and enlargement processing means for subjecting vicinity frames preceding and succeeding the correction frame range to enlargement processing.

An example of the enlargement processing means is one for enlarging, with respect to the vicinity frames preceding the start frame in the correction frame range, the frames such that the nearer the frame is to the start frame in the correction frame range, the higher the enlargement ratio thereof becomes, while enlarging, with respect to the vicinity frames succeeding the end frame in the correction frame range, the frames such that the nearer the frame is to the end frame in the correction frame range, the higher the enlargement ratio thereof becomes.

In an automatic stabilization control method in which a moving image picked up by a camera is subjected to automatic stabilization control, an automatic stabilization control method according to the present invention is characterized by comprising a step for designating a range of frames which are to be subjected to automatic stabilization control (hereinafter referred to as a correction frame range); a step for calculating a common area where the image is common among the frames within the correction frame range; an automatic stabilization control step for subjecting each of the frames within the correction frame range to automatic stabilization control processing involving enlargement of the common area; and an enlargement processing step for subjecting vicinity frames preceding and succeeding the correction frame range to enlargement processing.

An example of the enlargement processing step is one for enlarging, with respect to the vicinity frames preceding the start frame in the correction frame range, the frames such that the nearer the frame is to the start frame in the correction frame range, the higher the enlargement ratio thereof becomes, while enlarging, with respect to the vicinity frames succeeding the end frame in the correction frame range, the frames such that the nearer the frame is to the end frame in the correction frame range, the higher the enlargement ratio thereof becomes.

In a computer readable recording medium having an automatic stabilization control program, for subjecting a moving image picked up by a camera to automatic stabilization control, recorded thereon, a recording medium according to the present invention is characterized in that the automatic stabilization control program causes a computer to carry out a step for designating a range of frames which are to be subjected to automatic stabilization control (hereinafter referred to as a correction frame range); a step for calculating a common area where the image is common among the frames within the correction frame range; an automatic stabilization control step for subjecting each of the frames within the correction frame range to automatic stabilization control processing involving enlargement of the common area; and an enlargement processing step for subjecting vicinity frames preceding and succeeding the correction frame range to enlargement processing.

An example of the enlargement processing step is one for enlarging, with respect to the vicinity frames preceding the start frame in the correction frame range, the frames such that the nearer the frame is to the start frame in the correction frame range, the higher the enlargement ratio thereof becomes, while enlarging, with respect to the vicinity frames succeeding the end frame in the correction frame range, the frames such that the nearer the frame is to the end frame in the correction frame range, the higher the enlargement ratio thereof becomes.

The foregoing and other objects, features, aspects and advantages of the present invention will become more apparent from the following detailed description of the present invention when taken in conjunction with the accompanying drawings

DESCRIPTION OF THE PREFERRED EMBODIMENTS

Referring now to FIGS. 5 to 10, embodiments of the present invention will be described.

[1] Description of Automatic Stabilization Control Apparatus

Figure 5:
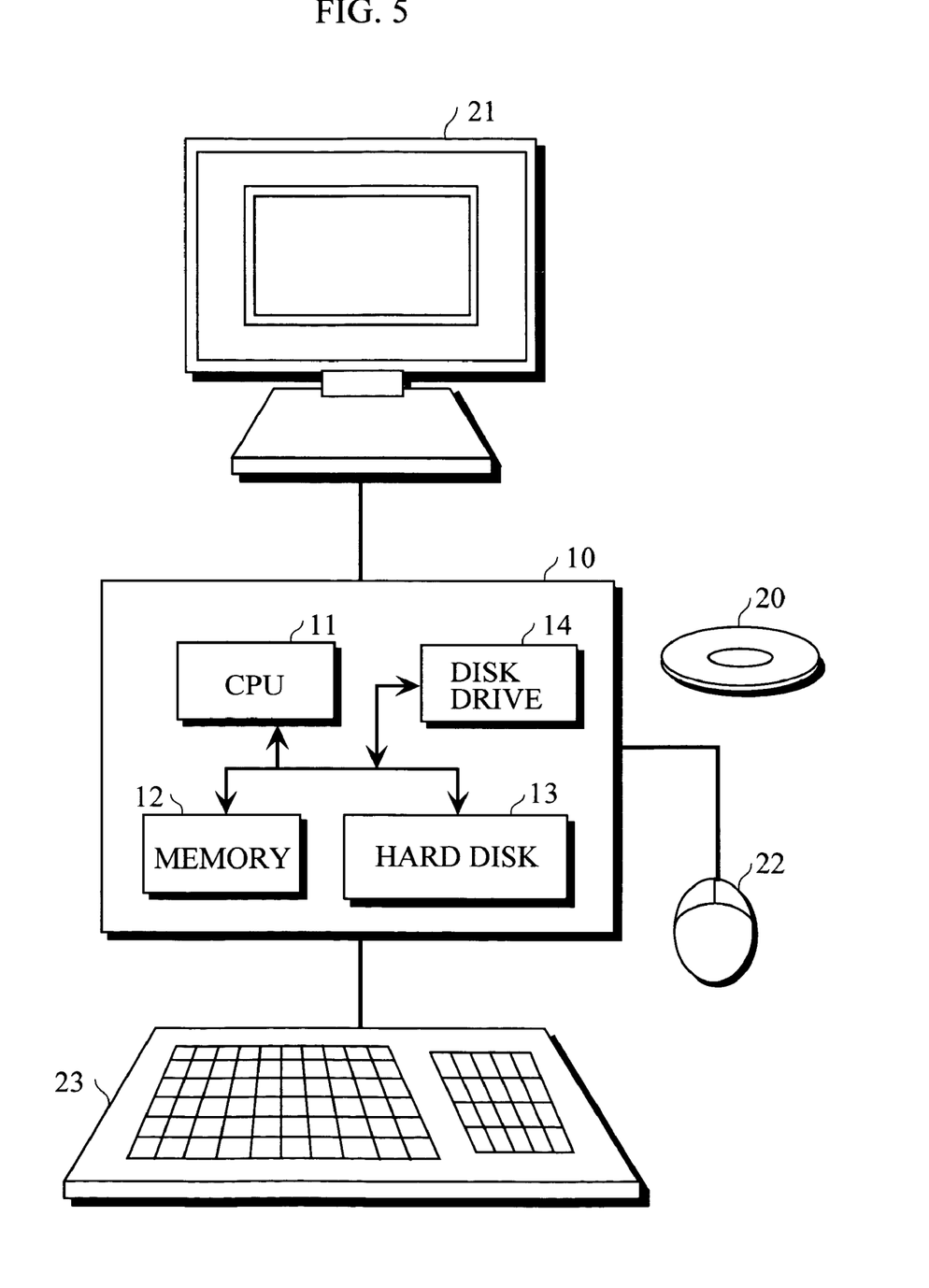
FIG. 5 is a block diagram showing the configuration of an automatic stabilization control apparatus.

FIG. 5 illustrates the configuration of an automatic stabilization control apparatus.

The automatic stabilization control apparatus is realized by a personal computer 10. A display 21, a mouse 22, and a keyboard 23 are connected to the personal computer 10. The personal computer 10 comprises a CPU 11, a memory 12, a hard disk 13, and a drive 14 of a removable disk 20 such as a CD-ROM.

The hard disk 13 stores an automatic stabilization control program in addition to an OS (Operation System) or the like. The automatic stabilization control program is installed in the hard disk 13 using the removable disk 20 such as the CD-ROM storing the program. It is assumed that the hard disk 13 previously stores a moving image file picked up by a video camera or the like.

Figure 6:
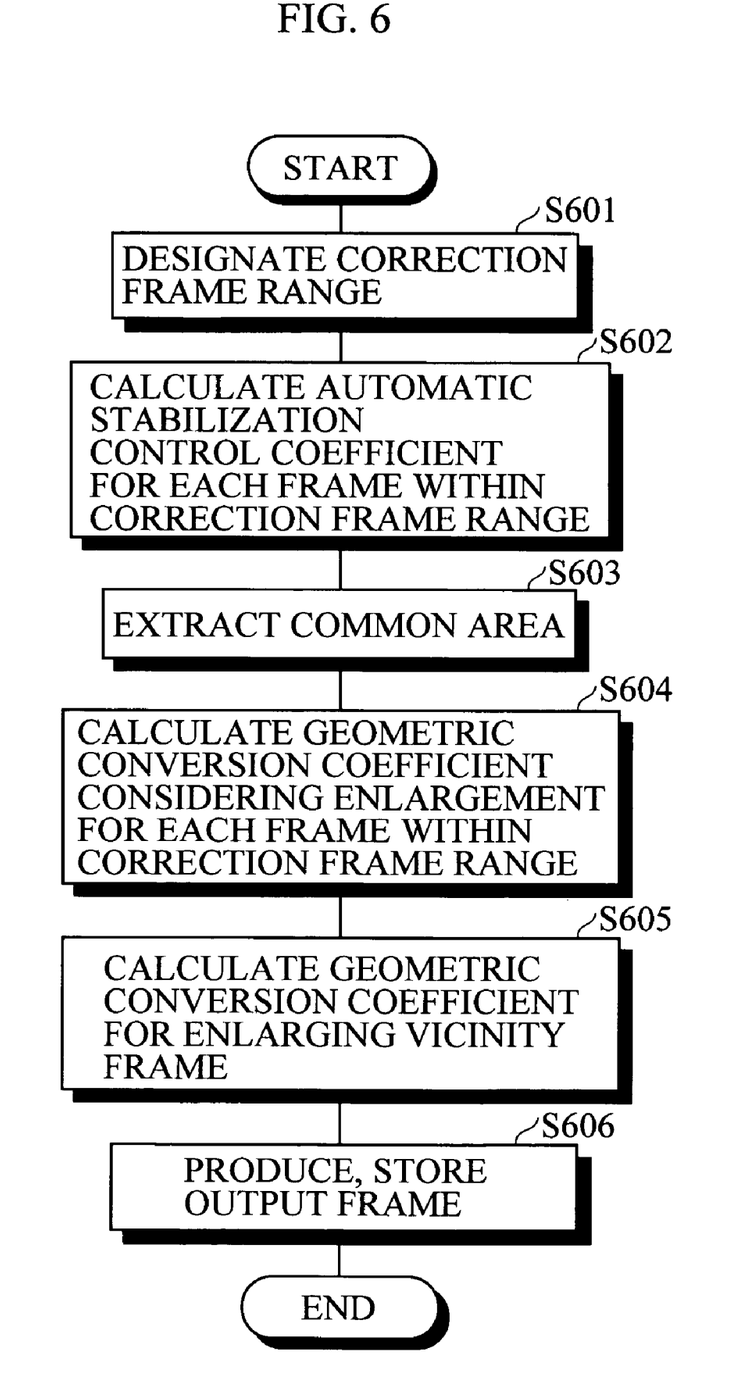
FIG. 6 is a flow chart showing the procedure for automatic stabilization control processing for realizing the present invention.

[2] Description of Automatic Stabilization Control Processing Performed by CPU in Case Where Automatic Stabilization Control Program is Started FIG. 6 shows the procedure for entire processing of automatic stabilization control carried out by the CPU 11.

In the step S601, processing for causing a user to designate a range of frames which are to be subjected to automatic stabilization control (a correction frame range) from data representing a moving image is performed.

In the step S602, an automatic stabilization control coefficient for carrying out automatic stabilization control is calculated for each of the frames within the correction frame range. The processing is performed in accordance with the procedure described in FIG. 2.

In the step S603, an image area (common area) where the image is common among all the frames within the correction frame range is extracted from the automatic stabilization control coefficient, for each of the frames within the correction frame range, calculated in the step S602.

In the step S604, a geometric conversion coefficient for carrying out automatic stabilization control while enlarging each of the frames from an enlargement coefficient calculated from the respective sizes of the common area extracted in the step S603 and the original image and the automatic stabilization control coefficient, for each of the frames within the correction frame range, calculated in the step S602.

More specifically, the enlargement coefficient is represented by a geometric conversion matrix using as coefficients an enlargement ratio calculated from the respective sizes of the common area and the original image and cutting coordinates (coordinates in the common area in the frame). The automatic stabilization control coefficient for each of the frames is represented by a geometric conversion matrix such as two-dimensional rigid motion or affine transformation. The geometric conversion coefficient for carrying out automatic stabilization control while enlarging a frame is represented by the product of the geometric conversion matrix representing the enlargement coefficient corresponding to the frame and a geometric conversion matrix representing the automatic stabilization control coefficient corresponding to the frame.

In the step S605, a geometric conversion coefficient for enlarging frames in the vicinity of the correction frame range is calculated. In the present embodiment, the vicinity frames preceding the start frame in the correction frame range are enlarged such that the nearer the frame is to the start frame in the correction frame range, the higher the enlargement ratio thereof becomes, and the vicinity frames succeeding the end frame in the correction frame range are enlarged such that the nearer the frame is to the end frame in the correction frame range, the higher the enlargement ratio thereof becomes. In the step S605, for each of the vicinity frames, a geometric conversion coefficient for enlarging the vicinity frame is thus calculated.

In the step 606, an output frame is produced and stored. Each of the frames within the correction frame range is subjected to automatic stabilization control considering enlargement using the geometric conversion coefficient calculated in the step S604, to produce the output frame. Each of the vicinity frames in the correction frame range is subjected to enlargement processing using the geometric conversion coefficient calculated in the step S605, to produce the output frame. The other frame is taken as an output frame as it is without being subjected to any processing.

Figure 7:
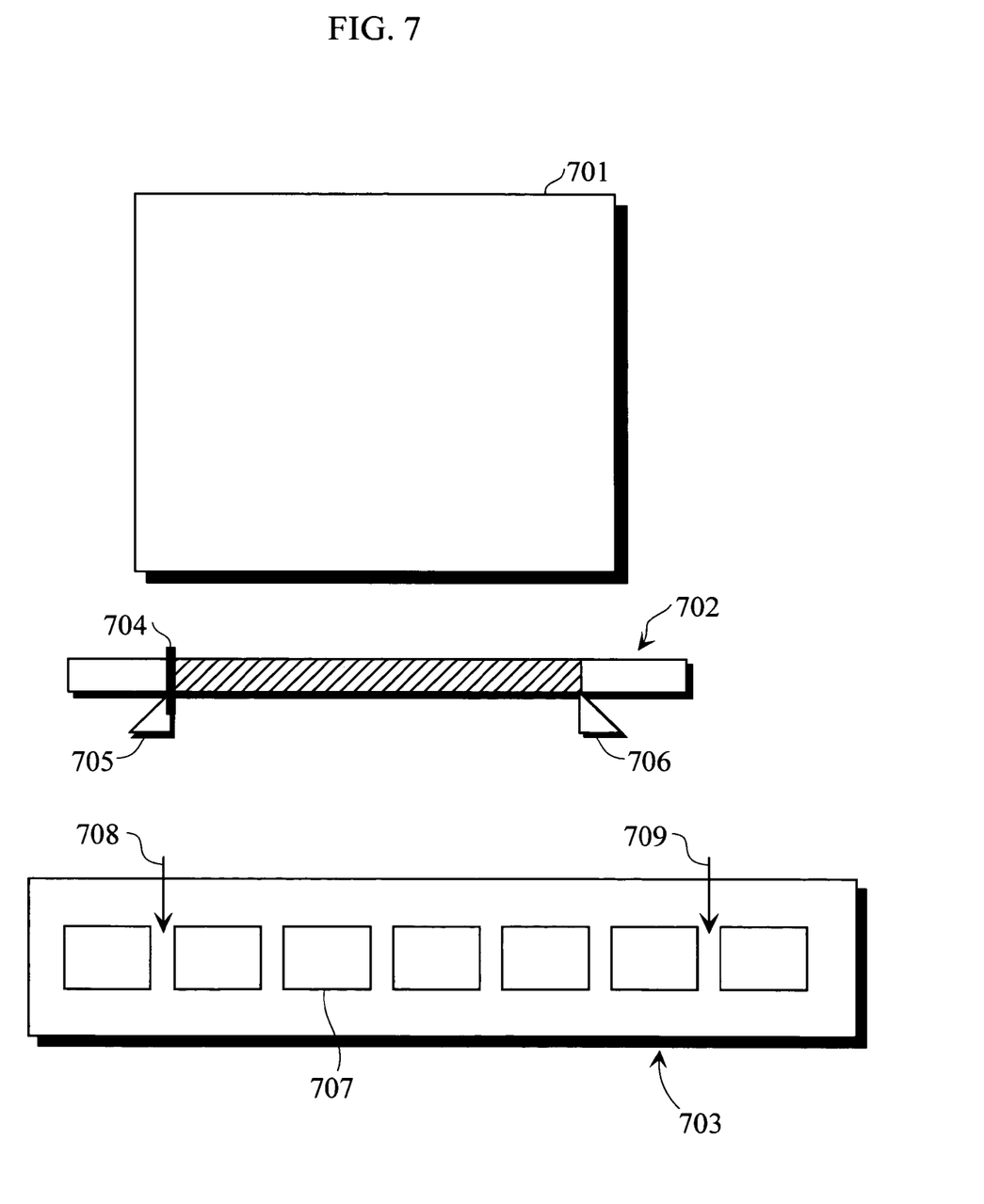
FIG. 7 is a schematic view showing a user interface for causing a user to designate a range of frames which are to be subjected to automatic stabilization control.

FIG. 7 illustrates a user interface for causing a user to designate a range of frames which are to be subjected to automatic stabilization control (a correction frame range).

In FIG. 7, reference numeral 701 denotes a screen on which an image in the designated frame is displayed, and reference numeral 702 denotes a bar representing the rough position of the designated frame. Reference numeral 703 denotes a window representing the more detailed position of the frame.

Reference numeral 704 denotes a pointer for designating the position of the frame displayed on the screen 701, which is moved by a dragging operation of the mouse. Reference numeral 705 denotes a pointer for designating the start frame in the correction frame range, which can be moved by a dragging operation of the mouse. Reference numeral 706 denotes a pointer for designating the end frame in the correction frame range, which can be moved by a dragging operation of the mouse.

Reference numeral 707 denotes a thumb-nail image displayed with each of the frames reduced in order to more specifically designate the frame. Reference numeral 708 denotes a pointer for designating the start frame in the correction frame range, which can be moved by a dragging operation of the mouse. Reference numeral 709 denotes a pointer for designating the end frame in the correction frame range, which can be moved by a dragging operation of the mouse.

The pointer 705 and the pointer 708 are synchronized with each other. When either one of the pointers is designated, the other pointer is automatically moved to a suitable position. Similarly, the pointer 706 and the pointer 709 are also synchronized with each other. When either one of the pointers is designated, the other pointer is automatically moved to a suitable position. The user designates the correction frame range by moving the pointer (705, 706, 708, 709) while confirming the frame displayed on the window 701.

Figure 8:
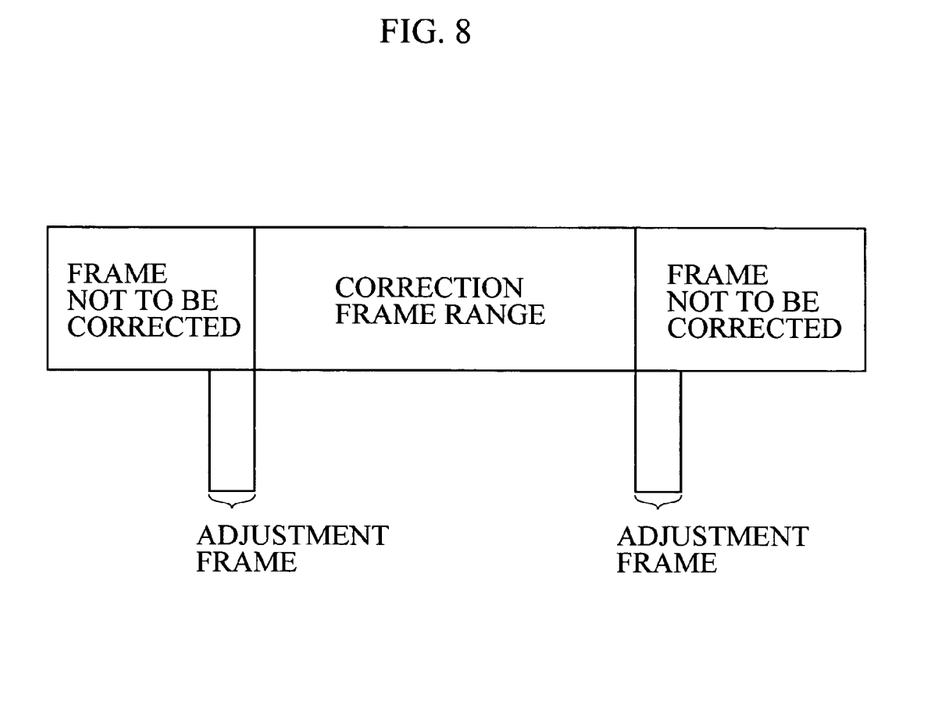
FIG. 8 is a schematic view for explaining that a range of frames which are to be subjected to automatic stabilization control and frames in the vicinity thereof are processed as adjustment frames.

Referring to FIG. 8, description is made of processing for enlarging vicinity frames in the correction frame range.

As described in the foregoing, with respect to the frames (frames to be corrected) within the correction frame range, an image area (common area) where the image is common among all the frames within the correction frame range is extracted. The common area is smaller in size than the original image. Therefore, the frame within the correction frame range must be enlarged at the time of automatic stabilization control. When only this portion is enlarged, an enlargement ratio rapidly differs between frames, which are not to be corrected, preceding and succeeding the correction frame range, resulting in an unnatural video. Out of the frames, which are not to be corrected, shown in FIG. 8, the frames (e.g., ten frames) in the vicinity of the correction frame range are frames to be adjusted (hereinafter referred to as adjustment frames).

The adjustment frames preceding the start frame in the correction frame range are enlarged such that the nearer the frame is to the start frame in the correction frame range, the higher the enlargement ratio thereof becomes, and the adjustment frames succeeding the end frame in the correction frame range are enlarged such that the nearer the frame is to the end frame in the correction frame range, the higher the enlargement ratio thereof becomes.

Figure 9:
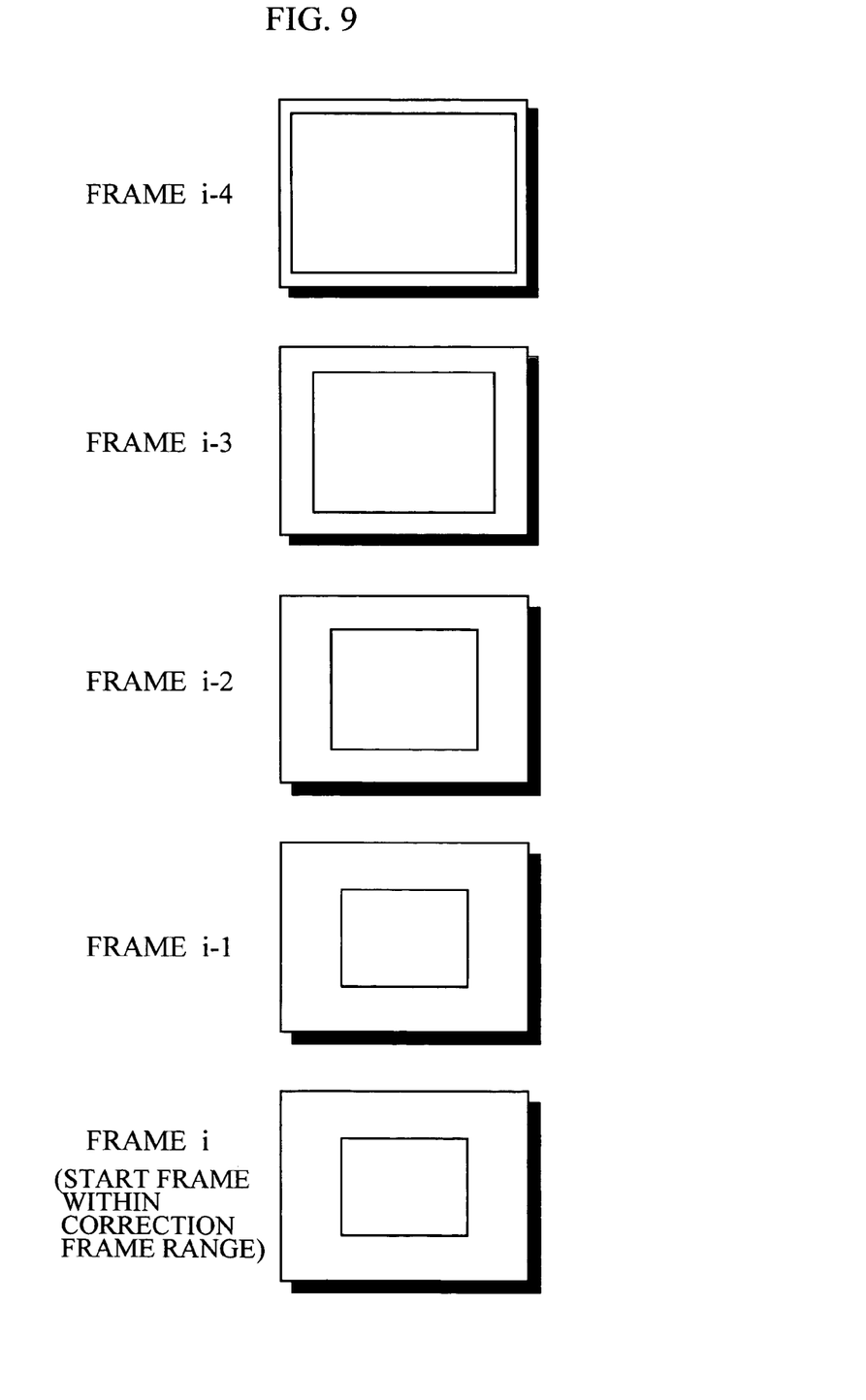
FIG. 9 is a schematic view for explaining a method of enlarging adjustment frames in the vicinity of a range of frames which are to be subjected to automatic stabilization control.

Referring to FIG. 9, description is made of processing for gradually enlarging the adjustment frames preceding the start frame in the correction fame range.

A frame i in FIG. 9 is taken as a start frame in the correction frame range. A square inside the frame i shall represent a common area in the correction frame range. At the time of automatic stabilization control, the common area is enlarged such that the size thereof is the same as the size of the original frame.

A frame i-4 to a frame i-1, in FIG. 9 represent adjustment frames (vicinity frames) preceding the start frame i in the correction fame range. In the adjustment frames i-4 to i-1, an area which is to be gradually enlarged is narrowed, as indicated by an inner square, that is, an enlargement ratio is gradually increased. Consequently, unnaturalness of an enlargement/reduction ratio can be eliminated between the frame which is subjected to automatic stabilization control and the other frame.

Figure 10:
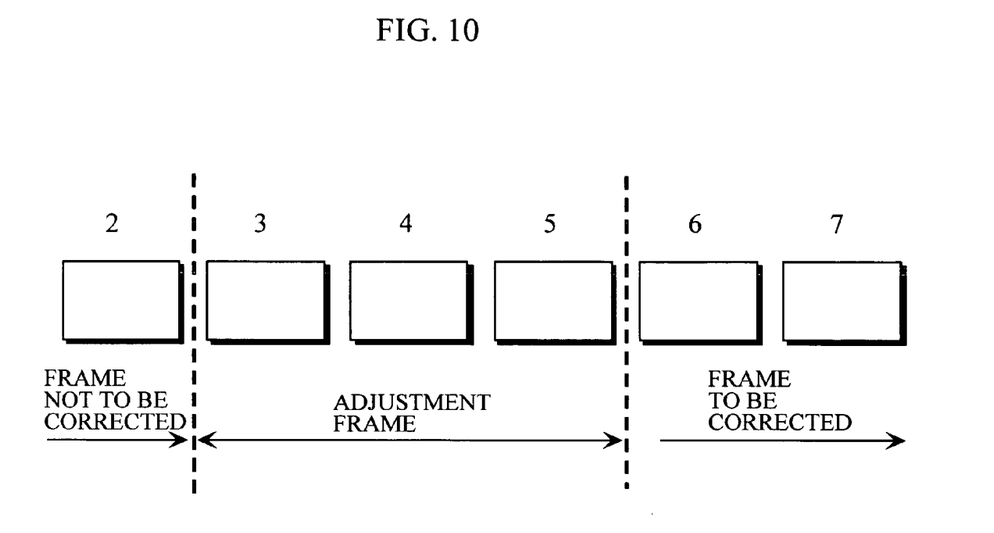
FIG. 10 is a schematic view for explaining a method of calculating a geometric conversion coefficient for enlarging adjustment frames.

Referring now to FIG. 10, description is made of a method of calculating a geometric conversion coefficient for enlarging an adjustment frame. A geometric conversion coefficient for enlarging the adjustment frame can be calculated by applying a method of synthesizing intermediate images between two images, disclosed in JP-A-2001-222707.

In FIG. 10, it is assumed that the sixth and seventh frames are frames which are to be subjected to automatic stabilization control, the third to fifth frames are adjustment frames preceding the start frame in the correction frame range, and the second frame is a frame, which is not to be corrected, preceding the adjustment frames.

The sixth frame is the start frame in the correction frame range. An image in the sixth frame is an image used as the basis of automatic stabilization control, so that a coordinate axis of the image becomes a coordinate axis in geometric conversion made in carrying out automatic stabilization control of the other frame within the correction frame range. When it is assumed that there is no enlargement processing of a common area, therefore, a geometric conversion coefficient for subjecting the sixth frame to automatic stabilization control is a unit matrix. Since an area common between the sixth frame and the seventh frame is enlarged such that the size thereof is the same as the size of the original image, however, a geometric conversion coefficient for subjecting the sixth frame to automatic stabilization control considering enlargement is a geometric conversion matrix other than the unit matrix.

On the other hand, the second frame is neither subjected to automatic stabilization control nor enlarged, so that a geometric conversion matrix for subjecting the second frame to automatic stabilization control is a unit matrix. Here consider two images in the second frame and the sixth frame. In this case, an image intermediate between the two images can be produced in a linear interpolation manner using the method disclosed in JP-A-2001-222707. For example, an image in the fourth frame is considered to be an intermediate image obtained by distributing the two frames, i.e., the second frame and the sixth frame (the start frame in the correction frame range) at a ratio of 5:5, thereby making it possible to calculate, from a geometric conversion matrix between the two images, a geometric conversion matrix for converting each of the images into the intermediate image.

In JP-A-2001-222707, the two images are converted into the intermediate image using the obtained geometric conversion matrix, to match colors. On the other hand, in the present embodiment, the fourth frame is converted using either one of the geometric conversion matrixes for converting each of the images into the intermediate image.

In the case of the third frame, an image in the third frame is considered to be an intermediate image obtained by distributing the two frames, i.e., the second frame and the sixth frame at a ratio of 3 to 1, to calculate, from a geometric conversion matrix between the two images, a geometric conversion matrix for converting each of the images into the intermediate image (or a geometric conversion matrix for converting one of the images into the intermediate image). The third frame is converted using the obtained conversion matrix. In the case of the fifth frame, an image in the fifth frame is considered to be an intermediate image obtained by distributing the two frames, i.e., the second frame and the sixth frame at a ratio of 1 to 3, to calculate, from a geometric conversion matrix between the two images, a geometric conversion matrix for converting each of the images into the intermediate image (or a geometric conversion matrix for converting one of the images into the intermediate image). The third frame is converted using the obtained conversion matrix.

As to an adjustment frame succeeding the end frame in the correction frame range, an image in the adjustment frame may be considered to be an intermediate image obtained by distributing two frame, i.e., a frame, which has not been adjusted yet, succeeding the adjustment frame and the end frame in the correction frame range.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An automatic stabilization control apparatus that subjects a moving image file which comprises moving image data picked up by a camera and which is stored in a storage device to automatic stabilization control, the automatic stabilization control apparatus comprising:
- a first unit arranged to allow a user to designate a range of frames which are to be subjected to automatic stabilization control (hereinafter referred to as a correction frame range) out of image frames in the moving image file;
- a second unit arranged to calculate a common area where the image is common among all of the frames within the correction frame range;
- a third unit arranged to subject each of the frames within the correction frame range to automatic stabilization control processing involving enlargement of the common area; and
- a fourth unit arranged to subject vicinity frames preceding and succeeding the correction frame range to enlargement processing, wherein the first unit includes a unit arranged to display the image frames in the moving image file to allow the user to confirm contents of the image frames in the moving image file.

2. The automatic stabilization control apparatus according to claim 1, wherein
the fourth unit enlarges, with respect to the vicinity frames preceding the start frame in the correction frame range, the frames such that the nearer the frame is to the start frame in the correction frame range, the higher the enlargement ratio thereof becomes, while enlarging, with respect to the vicinity frames succeeding the end frame in the correction frame range, the frames such that the nearer the frame is to the end frame in the correction frame range, the higher the enlargement ratio thereof becomes.

3. An automatic stabilization control method in which a moving image file which comprises moving image data picked up by a camera and which is stored in a storage device is subjected to automatic stabilization control, the automatic stabilization control method comprising:
- a first step for allowing a user to designate a range of frames which are to be subjected to automatic stabilization control (hereinafter referred to as a correction frame range) out of image frames in the moving image file;
- a second step for calculating a common area where the image is common among all of the frames within the correction frame range;
- a third step for subjecting each of the frames within the correction frame range to automatic stabilization control processing involving enlargement of the common area; and
- a fourth step for subjecting vicinity frames preceding and succeeding the correction frame range to enlargement processing, wherein the first step includes a step for displaying the image frames in the moving image file to allow the user to confirm contents of the image frames in the moving image file.

4. The automatic stabilization control method according to claim 3, wherein
the fourth step is for enlarging, with respect to the vicinity frames preceding the start frame in the correction frame range, the frames such that the nearer the frame is to the start frame in the correction frame range, the higher the enlargement ratio thereof becomes, while enlarging, with respect to the vicinity frames succeeding the end frame in the correction frame range, the frames such that the nearer the frame is to the end frame in the correction frame range, the higher the enlargement ratio thereof becomes.

5. A computer readable recording medium having an automatic stabilization control program, for subjecting a moving image file which comprises moving image data picked up by a camera and which is stored in a storage device to automatic stabilization control, recorded thereon, the computer readable recording medium wherein the automatic stabilization control program causes a computer to carry out:
- a first step for allowing a user to designate a range of frames which are to be subjected to automatic stabilization control (hereinafter referred to as a correction frame range) out of image frames in the moving image file;
- a second step for calculating a common area where the image is common among all of the frames within the correction frame range;
- a third step for subjecting each of the frames within the correction frame range to automatic stabilization control processing involving enlargement of the common area; and
- a fourth step for subjecting vicinity frames preceding and succeeding the correction frame range to enlargement processing, wherein the first step includes a step for displaying the image frames in the moving image file to allow the user to confirm contents of the image frames in the moving image file.

6. The computer readable recording medium according to claim 5, wherein
the fourth step is for enlarging, with respect to the vicinity frames preceding the start frame in the correction frame range, the frames such that the nearer the frame is to the start frame in the correction frame range, the higher the enlargement ratio thereof becomes, while enlarging, with respect to the vicinity frames succeeding the end frame in the correction frame range, the frames such that the nearer the frame is to the end frame in the correction frame range, the higher the enlargement ratio thereof becomes.

* * * * *